US006295460B1

(12) United States Patent
Nagel et al.

(10) Patent No.: US 6,295,460 B1
(45) Date of Patent: Sep. 25, 2001

(54) MODEM FOR SELECTIVELY CONNECTING TO A LAND LINE OR TO A CELLULAR TELEPHONE

(75) Inventors: Paul E. Nagel, The Woodlands; Robin T. Castell, Spring; Randall L. Jones, Plano; Thomas G. Bunch, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/148,661

(22) Filed: Nov. 5, 1993

Related U.S. Application Data

(63) Continuation-in-part of application No. 07/972,949, filed on Nov. 6, 1992, and a continuation-in-part of application No. 07/973,625, filed on Nov. 9, 1992, now Pat. No. 5,428,671.

(51) Int. Cl.[7] .................................................. H04Q 7/20
(52) U.S. Cl. ........................ 455/557; 455/550; 379/93.28
(58) Field of Search ................................. 379/58, 59, 93, 379/94, 96, 97, 98, 93.01, 93.28, 93.29; 455/90, 418, 422, 432, 436, 553, 556, 557, 575, 550

(56) References Cited

U.S. PATENT DOCUMENTS

| Re. 34,034 | 8/1992 | O'Sullivan ............................ 379/59 |
| 4,012,596 | 3/1977 | West, Jr. et al. .................. 179/41 A |

(List continued on next page.)

FOREIGN PATENT DOCUMENTS

| 459 279 | 12/1991 | (EP) . |
| 504 007 | 9/1992 | (EP) . |
| 2 170 977 | 8/1986 | (GB) . |
| WO 89 05553 | 6/1989 | (WO) . |
| WO 91/07044 | 5/1991 | (WO) . |
| WO 92/10047 | 6/1992 | (WO) . |

OTHER PUBLICATIONS

Installation and User Instructions for *The Portable Cellular Connection*™, Motorola, Inc. (1992).
The Go Anywhere Phone, Motorola, Inc. (1987).
CP 3000, Uniden Corporation of America (1988).
CDL 410 Features, OKI Telecom (9/86).
"Features and Benefits," Motorola, Inc. (1988).
Spectrum Cellular and Dacom Systems Sign Bridge Manufacturing and Distribution Agreement for United Kingdom, Press Release dated Jan. 3, 1988, Spectrum Cellular Corporation.

(List continued on next page.)

*Primary Examiner*—Nay Maung
(74) *Attorney, Agent, or Firm*—Akin, Gump, Strauss, Hauer & Feld, LLP

(57) ABSTRACT

A modem is incorporated into a laptop computer and directly connected to either a cellular phone, a land line, or both. The modem is provided with two connectors, one for connection with a cellular phone or external DAA, the other for connection to a normal land line via an internal DAA. The modem selectively enables either the connector for the cellular phone or external DAA, or the connector for its internal DAA. The modem defaults to selecting the cellular phone or external DAA if it is connected, and only if they are not connected selects the internal DAA. These defaults can be overridden by user commands. Further, the modem can independently power down a connected internal DAA, external DAA, or cellular phone to conserve power.

9 Claims, 9 Drawing Sheets

U.S. PATENT DOCUMENTS

| | | | |
|---|---|---|---|
| 4,568,800 | 2/1986 | Orikasa | 179/2 EB |
| 4,658,096 | 4/1987 | West, Jr. et al. | 379/59 |
| 4,680,787 | 7/1987 | Marry | 379/63 |
| 4,697,281 | 9/1987 | O'Sullivan | 379/59 |
| 4,718,080 | 1/1988 | Serrano et al. | 379/59 |
| 4,737,975 | 4/1988 | Shafer | 379/58 |
| 4,752,949 | 6/1988 | Steinbeck et al. | 379/61 |
| 4,759,059 | 7/1988 | Christensen | 379/161 |
| 4,775,997 | 10/1988 | West, Jr. et al. | 379/58 |
| 4,837,300 | 6/1989 | Freeburg et al. | 379/59 |
| 4,837,812 | 6/1989 | Takahashi et al. | 379/98 |
| 4,852,146 | 7/1989 | Hathcock et al. | 379/58 |
| 4,868,863 | 9/1989 | Hartley et al. | 379/98 |
| 4,887,290 | 12/1989 | Dop et al. | 379/33 |
| 4,890,315 | 12/1989 | Bendixen et al. | 379/59 |
| 4,912,756 | 3/1990 | Hop | 379/60 |
| 4,972,457 | 11/1990 | O'Sullivan | 379/59 |
| 4,991,197 | 2/1991 | Morris | 379/58 |
| 5,127,041 | 6/1992 | O'Sullivan | 379/59 |
| 5,131,019 | 7/1992 | Sheffer et al. | 379/39 |
| 5,134,648 | 7/1992 | Hochfield et al. | 379/98 |
| 5,249,218 | 9/1993 | Sainton | 379/59 |

OTHER PUBLICATIONS

Spectrum Cellular Launches Portable Office with the Introduction of its LapPak Cellular Workstation, Press Release, Feb. 8, 1989, Spectrum Cellular Corporation.

Spectrum and Telular Jointly Announce Signing of Two Contracts and Agree to Collaborate on New Products, Press Release, Dec. 6, 1988, Spectrum Cellular Corporation.

Spectrum Cellular Announces Expanded Product Line Offering Additional Compatibility for its Bridge Cellular Modem, Press Release, Dec. 13, 1988, Spectrum Cellular Corporation.

Case Histories in Cellular Data Communications, Spectrum Cellular 1988.

Peter Shikli, *Solving Data Communications Problems with the Cellular Network*, PICO Jan. 1988, pp. 14–17.

HazCom One™, Spectrum Cellular.

Stockholder Relations, Spectrum Cellular.

Ameritech Mobile Communications Announces Mobil Access Data Service Utilizing Spectrum's Bridge and Span Cellular Modems, Press Release, Feb. 17, 1987, Spectrum Cellular.

Spectrum Cellular and Omnitel Announce Joint Development of First Internal Laptop Cellular Modem, Press Release, Aug. 24, 1987, Spectrum Cellular.

Tom Steinert–Threlkeld, *Ringing a new era for pay phones*, The Dallas Morning News.

Robert C. Adair, *Cellular & Data: Coming on Strong*, Cellular Business Jul. 1987, pp. 34–35.

Spectrum Cellular: The First Name in Cellular Data Communication, The Only Name You Need to Know.

Selling Cellular Data Communications Applications, Spectrum Cellular Corporation.

Compaq Apache Modem Board Level Design Specification, p. 12.

*Toshiba Modem Boasts Wireless Transmission*, Jun. 18, 1990.

*Networking*, Infoworld, Feb. 19, 1990 pp. 31, 39.

Press Kit, Intelligence Technology Corporation, Nov. 12, 1990.

*Hardware*, Infoworld, Feb. 12, 1990, p. 23.

*GRiD, PowerTek Debut Cellular/Laptop Combination*, Feb. 26, 1990, p. 19.

GRiD Portable Cellular Workstation Technical Specifications, PowerTek Industries, Inc.

Toshiba Modems, 5/90, Toshiba America Information Systems, Inc.

The Cellular Handbook, Microcom, Inc. 1990.

MNP Cellular Modems, Microcom Systems, Inc. 1990.

Microcom Announces New Cellular Family, Press Release, Jun. 26, 1990, Microcom.

Michael R. Zimmerman, *Microcom Unveils Cellular Modems for Laptop Users*, PC Week, Jun. 25, 1990.

Microcom Networking Protocol (MNP), A Brief Technical Overview, Microcom, Inc. 1990.

Celjack™ Technical Specification, Telular, Inc., 1989.

Compaq Mozart Modem Specification Rev. CX, pp. 15, 61.

MODEM FOR SELECTIVELY CONNECTING TO A LAND LINE OR TO A CELLULAR TELEPHONE

This is a continuation-in-part of application Ser. No. 07/972,949, abandoned filed Nov. 6, 1992 and a continuation-in-part of application Ser. No. 07/973,625, filed Nov. 9, 1992, now U.S. Pat. No. 5,428,671.

BACKGROUND OF THE INVENTION

1. Field of the Invention

The invention relates to a modem for selectively connecting a computer to a land line or to a cellular telephone. More specifically, the invention relates to a modem that has circuitry for selecting between two communications jacks, the first of which connects to an external DAA or to a cellular telephone, and the second of which connects to a land line via a DAA internal to the modem.

2. Description of the Related Art

In the year 1948, a simple device was invented that was to have a profound impact on modern life. That device was the electronic transistor. It was the transistor that first made computers technically practical. These first computers were behemoths—centralized machines servicing a large number of users and a large number of tasks. While the economic impact of these mainframe systems was tremendous, it was not until the subsequent development of the microprocessor, and the attendant development of the personal computer, that computer technology directly impacted the lives of the modern consumer and small businessman.

When the personal computer market exploded in the 1980's, it filled needs very different from those filled by the mainframe computer. Personal computers were used to perform individual, isolated tasks without communication with other computers except perhaps through manual exchange of floppy disks. The mainframe computer still served the requirements of centralized data access and coordination among a large number of users.

But as the personal computer market developed, the advantages and possibilities of communicating among these machines became apparent. One of the methods of communication that rose to the forefront was modem technology. By connecting modems to their personal computers, users could directly transfer data between and communicate in realtime with mainframes and other personal computers. For example, bulletin board systems have now become very popular, allowing a large number of users to remotely upload and download free software, exchange information, and engage in online forums. With modems' rising speeds, increased standardization, and expanding uses, one is now hard pressed to find a personal computer system that does not use a modem.

While intercommunication between personal computers and mainframes was on the rise, another development was to have an impact on the need for communicating with distant systems. Personal computers were becoming smaller. From the original large under-the-desk machines, desktop machines evolved, then transportables, and finally laptop and notebook computers. These laptops and notebooks are typically very mobile, easily traveling from city to city, state to state, and even country to country. But the advantage of portability itself presents a problem: while stationary machines can be conveniently connected to communication networks via a telephone line, laptop users might wish to establish communication links from countries with which their laptop's modems are not compatible, or they might wish to communicate where normal phone connections are not available, such as from a car, bus, or train.

Although standardized within a single country, telephone systems around the world are generally non-standard, and different hardware is required to connect to these various systems. Thus, a modem configured to connect to one country's phone system would generally not be suitable for connection to another's. The physical connection to a particular national phone system is made through what is known is a data access arrangement, or DAA. Each particular phone system will have its own associated DAA. Typically, modems are constructed with a DAA built in. That, however, means that a modem suitable for one country would not be able to connect to another country's phone system, or would at least require an external adaptor that would typically require external power.

With portable, laptop, and notebook computers, the problem of the different DAA's required for each country becomes even more apparent. One would not wish to buy a notebook or laptop with a built-in modem that could not be easily modified for use in another country. An international traveler might never be sure to which country's phone system he would primarily wish to connect. For example, if he lived in the United States, he would want his laptop's modem to be suitable for directly connecting to the United States' phone system. But if he moved to Germany, he would wish his laptop's modem to be suitable for directly connecting to the German phone system. But further, if our hypothetical businessman, living in the United States, traveled to Germany, he would want to be able to connect his laptop into the German phone system even though his laptop's modem is internally configured for connection to the United States phone system. This problem has been resolved to some extent by the use of external DAA units.

For a computer user in a car, bus, or train, another recent technological development provides possibilities for laptop and notebook modem communications. With the recent expansion of cellular telephone systems, cellular telephone has become a very common, and very portable, item. Not surprisingly, crude attempts at a marriage between cellular telephone technology and modem technology have keen made using laptop and notebook computers and cellular phones. By connecting a laptop to a cellular phone, one can access a telephone network in generally the same way as by directly hooking to a telephone wall outlet, or via a "land line."

It would be desirable to make as seamless of a link between a computer system and cellular telephone systems or various countries' phone systems. That is, it would be desirable to be able to transparently use different countries' phone systems depending on which the computer was then connected to, or to instead transparently use a cellular telephone.

SUMMARY OF THE INVENTION

A modem constructed according to the invention is typically incorporated into a laptop computer and directly connected to either a cellular phone, a land line, or both. Different makes and models of cellular phones can be connected to the laptop without modification of the laptop or its modem's hardware. Instead, the different cellular phones are selected through software.

A modem constructed according to the invention can establish a communications link via a cellular phone or a land line. The land line communications link is accomplished either by way of an external DAA or the modem's internal DAA. The modem is physically two boards. The proper internal DAA for the desired country is a daughterboard, while the rest of the components, including all external connectors, are located on the motherboard. The modem is provided with two connectors, both located on the motherboard, one of which can be connected to a cellular phone or to a land line via an external DAA, and the other of which can be connected to a normal phone line via the modem's internal DAA. The modem according to the invention selectively enables either the connector for connection to the cellular phone or external DAA, or instead selectively enables the connector to its internal DAA, which in turn connects to a normal phone line.

In use, the modem according to the invention first determines if a cellular phone or an external DAA is connected to the jack it uses for that purpose. It internally enables the signal lines to and from that jack, and sends a message intended for the user designated type of cellular phone. If the modem receives a response from that cellular phone, it then attempts to establish a communications link with that cellular phone. If the modem does not receive a response, no cellular phone is connected, so the modem determines whether an external DAA is connected to that jack by toggling a clock line low, to which an external DAA will respond by sending a country code via a data line. If the modem does not receive any country code, the modem assumes nothing is connected to the cellular phone/external DAA jack.

The modem then internally switches its signal lines to connect to its internal DAA. It again toggles the clock line low, which instructs the internal DAA to return a country code. If the internal DAA returns a country code, the modem establishes a communications link using its internal DAA, which in turn connects to a standard phone line jack. If no country code is returned, the modem returns an error to the host computer, as no communications device is connected to the modem.

If both a land line is connected to the internal DAA jack and a cellular phone is connected to the cellular phone/external DAA jack, the same sequence is followed, and the cellular phone is by default connected. Similarly, if a land line is connected to the internal DAA jack and an external DAA is connected, the external DAA is by default connected. These sequences, however, can be altered by commands from the host computer instructing the modem to instead use its internal DAA connected to the land line.

Further, the microcontroller on the modem according to the invention, other than merely selecting between its internal DAA and an external DAA or cellular phone, can selectively enable and disable the power supplies on the internal DAA and the external DAA.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Turning now to the drawings, FIG. 1A–D show a laptop computer 10 with a modem 12 constructed according to the invention connected for operation in a variety of configurations. The modem 12 is integrated into the laptop computer 10, and the modem 12 has two external jacks for connection to a variety of devices. The first of these jacks is an RJ11 type jack 14, and the second is an RJ45 type jack 16. Of course, these physical jacks are exemplary only, and other types of jacks could be used. Further, the modem 12 is preferably, but not necessarily, integrated into the laptop computer 10, and the laptop computer 10 could be a type of computer other than a laptop. For example, a desktop system or a notebook system would also benefit from being connected to the modem 12 constructed according to the invention.

Figure 1A:
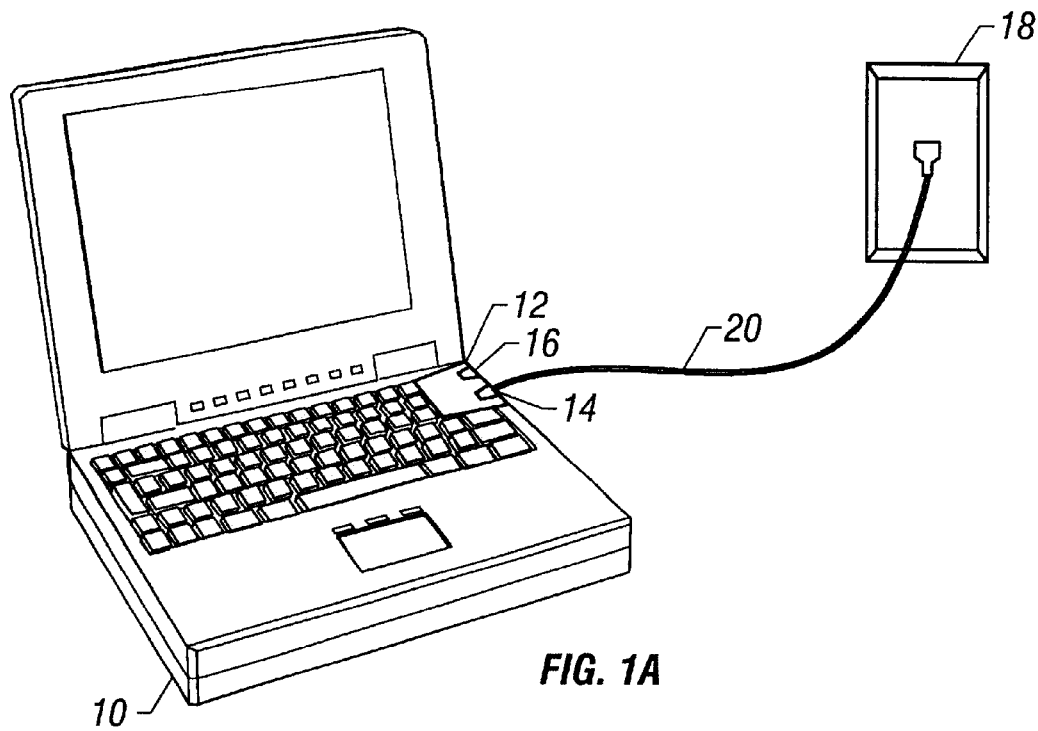
FIGS. 1A–D show a laptop computer with a modem constructed according to the invention connected for operation in various configurations.
Figure 1B:
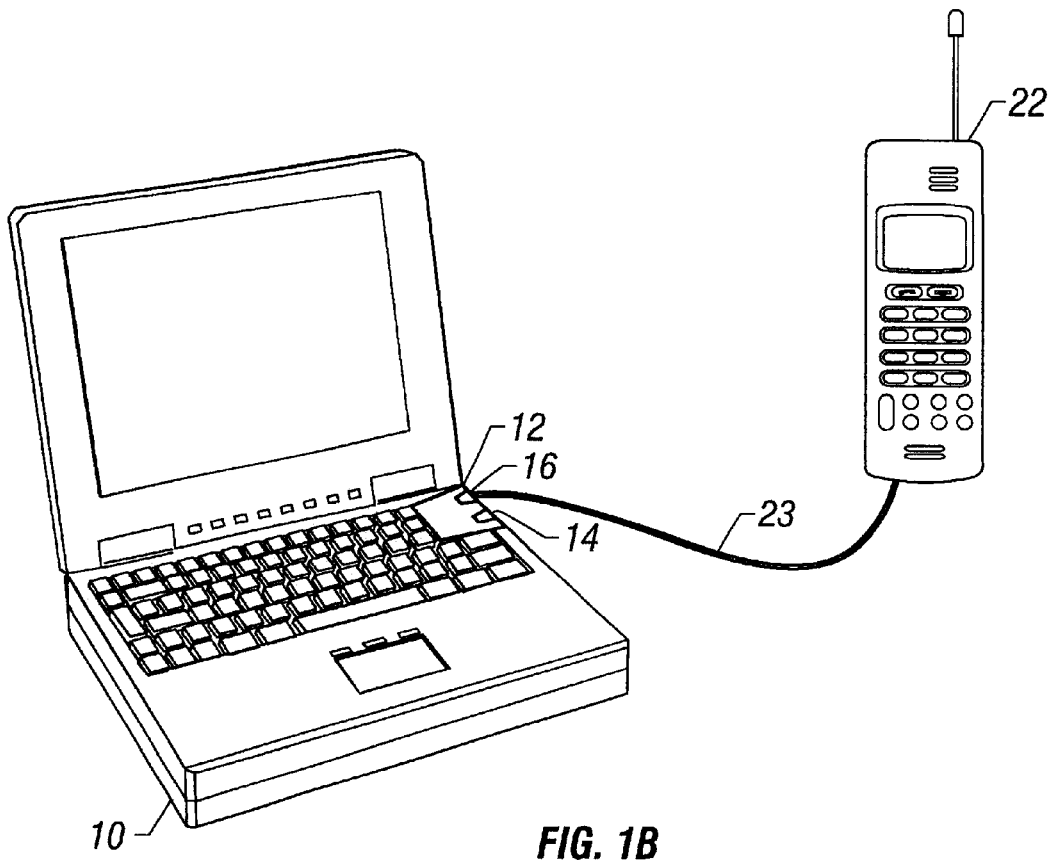

In FIG. 1A, the laptop computer 10 and the modem 12 are connected by way of the RJ11 type jack 14 and a cable 20 to a telephone wall outlet 18, as one would find in any typical home. The RJ45 type jack 16 is left unconnected. This configuration is analogous to a computer with an integrated modem connected to a telephone wall outlet.

FIG. 1B again shows the laptop computer 10, but in this configuration the modem 12 is connected to a cellular phone 22 via the RJ45 type jack 16 by an interface cable 23. In this configuration, the RJ11 type jack 14 is left unconnected.

Figure 1C:
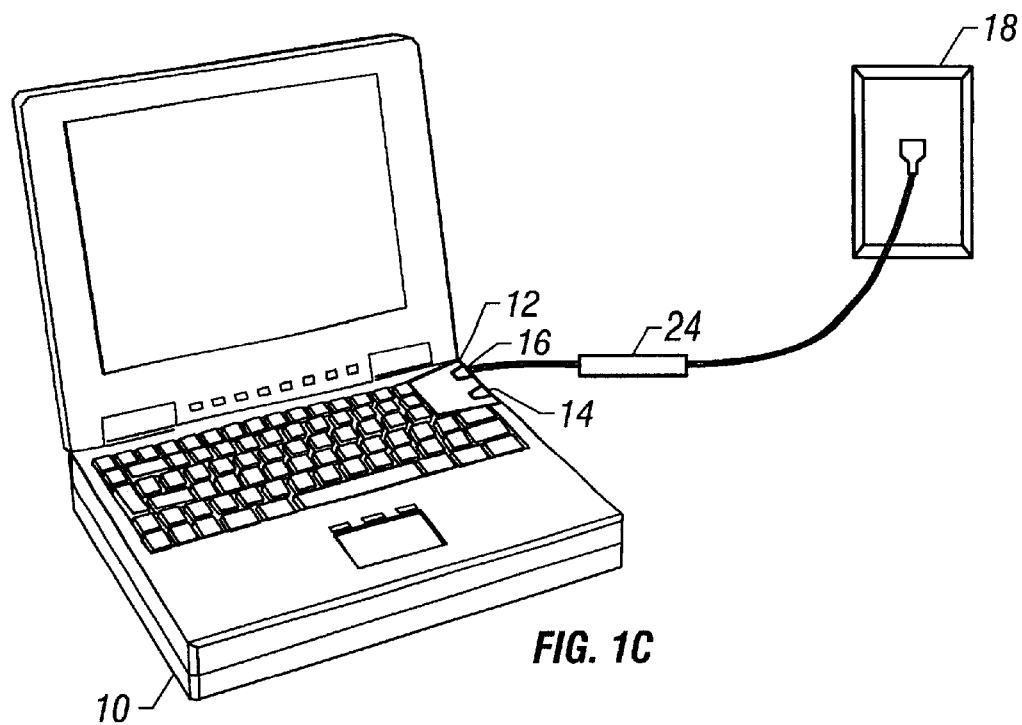

FIG. 1C shows the laptop computer 10 and modem 12 configured for operation in a foreign country. In FIG. 1C, the laptop computer 10 is connected via the RJ45 type jack 16 to a telephone wall outlet 18, but in this configuration an external DAA 24 provides the circuitry necessary to adapt to the foreign telephone system. As will later be seen, an advantage of the modem 12 constructed according to the invention is that it can be easily modified to change its internal, "native" country. That is, the external DAA 24 is only needed if the modem 12 has not been configured internally for the country to which one is attempting to connect the laptop computer 10. Thus, if the modem 12 is internally configured for the United States telephone system, if one is in the U.S., one need only connect the system as shown in FIG. 1A in order to communicate with the telephone system. Only if one goes to another country, say Germany, would one need the external DAA 24 as shown in FIG. 1C.

But if the user then moves to Germany, that user could easily have the modem 12 modified such that the German telephone system becomes its "native" phone system. This would be done by a technician simply switching out an internal DAA, which will be described later. Then, while in Germany, the user configures the laptop computer 10 as shown in FIG. 1A for communications with the German telephone system. When the user visits the United States, the user would then use the external DAA 24, which is then specifically designed for the United States.

Figure 1D:
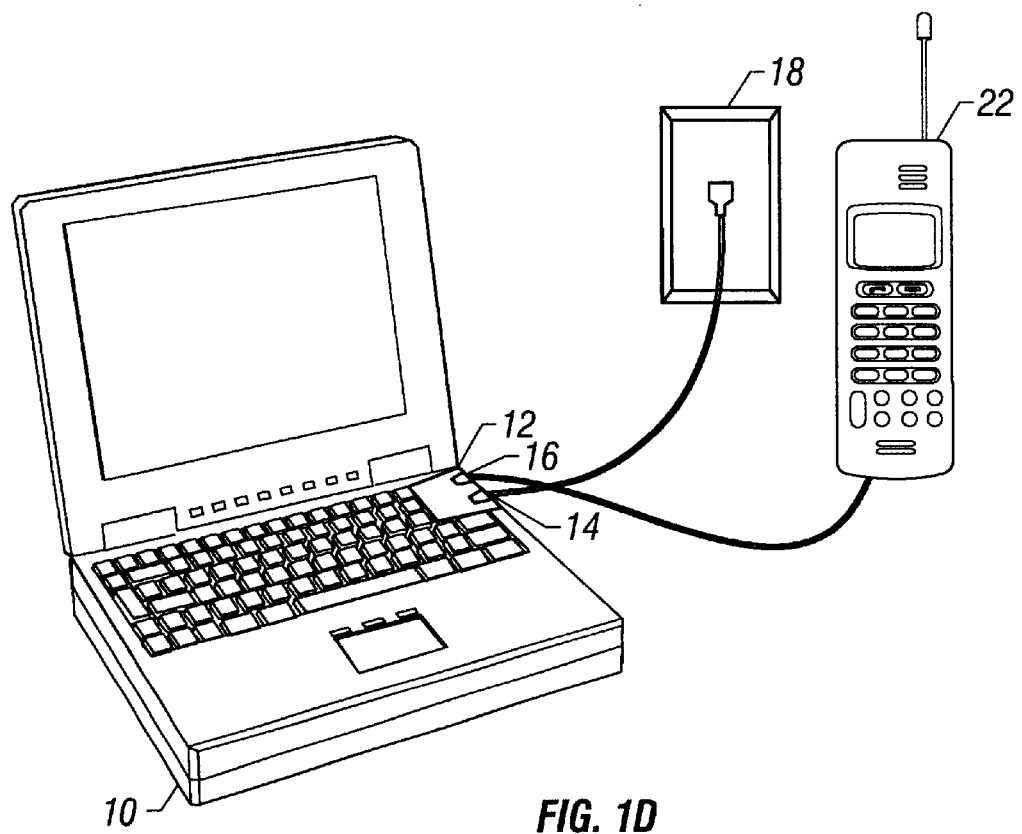

FIG. 1D shows a further possible configuration of the laptop computer 10 with the modem 12 constructed according to the invention. In FIG. 1D, the laptop computer 10 is connected to both the cellular phone 22 and the telephone wall outlet 18, which is here a telephone jack for the native telephone system of the modem 12. In this configuration, the laptop computer 10 is connected to the cellular phone 22 via the RJ45 type jack 16 and is connected to the native phone system via the RJ11 type jack 14 and the telephone wall outlet 18. As will be seen, an advantage of the modem 12 constructed according to the invention is that it can internally switch between communications with the cellular phone 22 and the telephone wall outlet 18.

As will be later described, the modem 12 constructed according to the invention automatically determines when the cellular phone 22 is connected. It also automatically detects whether the external DAA 24 is connected to the RJ45 type jack 16. In doing so, it automatically determines the country for which the external DAA 24 is constructed. Similarly, the modem 12 automatically determines for which country it is internally configured. It then tailors operation for the cellular phone 22 or for the country to which it is currently connected.

Logical Blocks of the Modem 12

Figure 2:
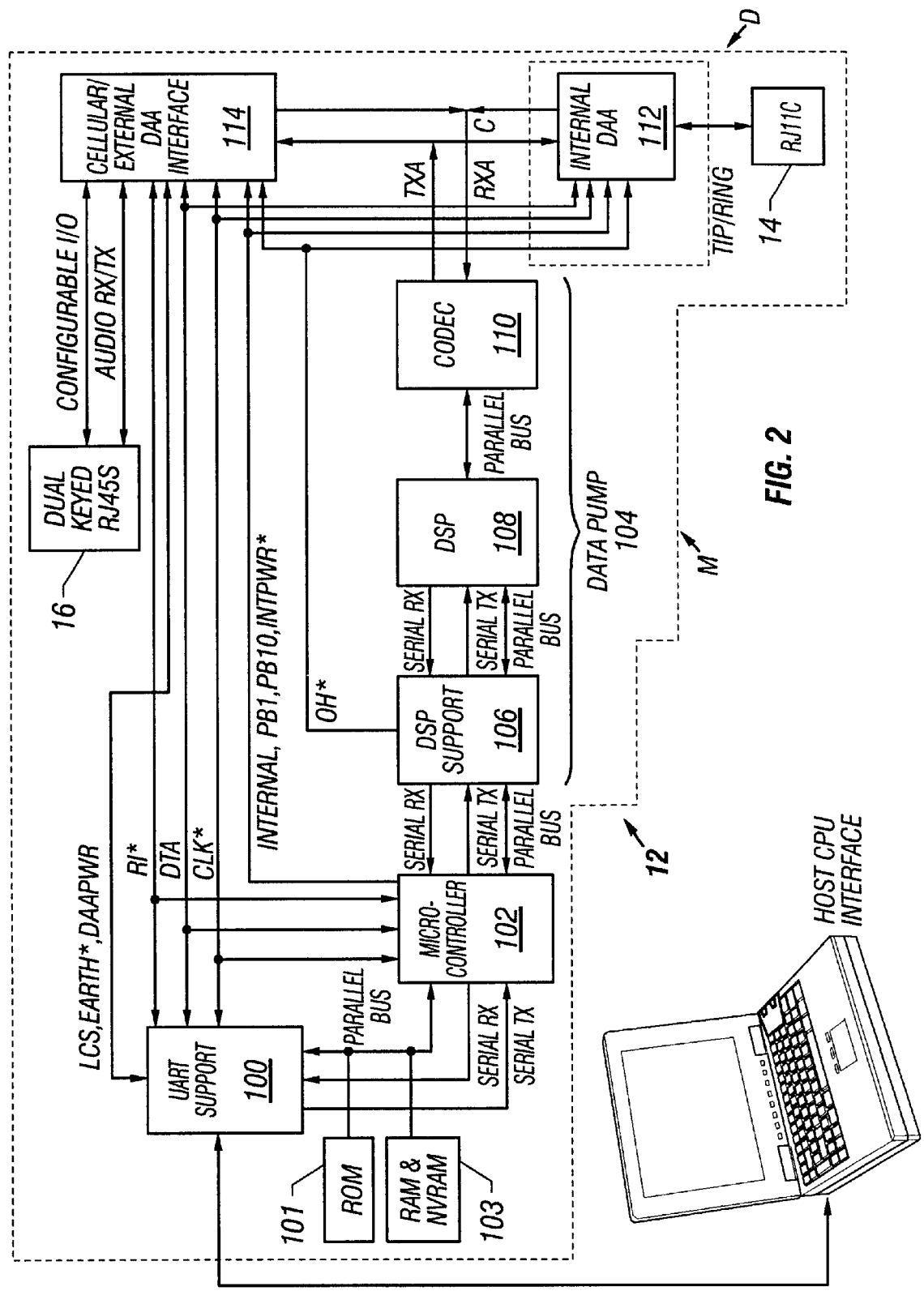
FIG. 2 shows a block diagram of the hardware of a modem constructed according to the invention.

FIG. 2 shows a logical block diagram of the various elements of the modem 12 constructed according to the invention. The modem 12 preferably consists of two circuit boards combined to form the small unit which can be contained in the laptop computer 10. A motherboard M contains all of the components, including the RJ11 type jack 14 and the RJ45 type jack 16, except those forming the internal DAA. The components of the internal DAA are located on a daughterboard D which overlies the motherboard M. This allows easy substitution of internal DAA's for the various countries without requiring complete design of the entire modem 12, particularly the motherboard M. Of particular note is that all of the components necessary to develop a connection between the computer 10 and the cellular phone 22 are located on the motherboard M. The laptop computer 10 physically contains the modem 12 and connects via an internal connector to a UART/support chip 100. The UART/support chip 100 typically connects to the host bus of the laptop computer 10, for example an EISA or ISA bus, although it could be any type of typical communications bus. The UART/support chip 100 then appears as a universal asynchronous receiver transmitter (UART) to the laptop computer 10. The UART/support chip 100 connects to, among other things, a microcontroller 102 by both serial and parallel buses. The UART/support chip 100 provides a variety of functions to the modem 12, including communications to the laptop computer 10, clock controls, configurable registers, and power down control for the microcontroller 102. The UART/support chip 100 is typically an application specific integrated circuit, but could instead be constructed of discrete components.

The microcontroller 102 is typically an embedded controller, and in the preferred embodiment is a 68302 integrated multiprotocol processor, manufactured by Motorola Incorporated. A read only memory (ROM) 101 and random access memory (RAM) and non-volatile RAM (NVRAM) 103 are provided to allow for sufficient ROM and RAM space to contain the necessary firmware and data to operate the modem 12.

The microcontroller 102 communicates with a data pump 104 by both serial and parallel buses. The data pump 104 is typically a modem data pump chip set supporting the various protocols of modem communication, including V.32bis protocol and fax protocols. In the preferred embodiment, the data pump 104 is a WE® DSP16A-V32FB-LT V.32bis plus FAX Data Pump Chip Set, sold by AT&T Microelectronics, and configured for 14.4 Kbps operation as a fax/modem. This chip set includes a digital signal processor (DSP) support chip 106, a DSP 108, and a coder-decoder (CODEC) 110. This chip set is interconnected according to AT&T specifications and provides the typical data pump features of control, analog-digital and digital-analog conversion, digital signal processing, and interfacing.

The microcontroller 102 communicates with the data pump 104 by both serial and parallel buses. The serial bus is used to transmit and receive data that will become the transmitted and received modem data, while the parallel bus is used to control and configure various features within the data pump 104. These features are controlled through the DSP support chip 106. The data pump 104 converts the digital serial data provided by the microcontroller 102 into the appropriate analog format. This is typically done by the DSP 108, which then transmits and receives the data via the CODEC 110.

The CODEC 112 connects to the actual external lines through analog transmit and receive signals, TXA and RXA. These signals are selectively connected to either an internal DAA 112 or a cellular/external DAA interface 114. Details are provided below. The internal DAA is then connected to a normal telephone line by the RJ11 type jack 14, while the cellular/external DAA interface 114 can be connected through the RJ45 type jack 16 to the external DAA 24 or the cellular phone 22.

Various signals are typically used to interface with telephone lines, including the ring indicator signal RI* and the off hook control signal OH*. A DAA generates and receives these signals, as well as the TXA and RXA signals, and converts them into a format suitable for that particular country's two-wire telephone system, or whatever type of telephone system to which the DAA is connected. The internal DAA 112 and the cellular/external DAA interface 114 receive OH* from the DSP support chip 106. Three lines are bi-directionally connected to the cellular/external DAA interface 114 and to the internal DAA 112. They are the lines carrying the RI* signal, a data signal DTA, and a clock signal CLK*. The functions of these signals in the modem 12 constructed according to the invention will become apparent.

In operation, the modem 12 according to the invention and as logically shown in FIG. 2 is connected in one of the configurations shown in FIGS. 1A–D. Thus, the RJ45 type jack 16 is connected to either a cellular phone 22 or an external DAA 24, which would generally be a DAA constructed for operation in a country other than that of the internal DAA 112. The RJ11 type jack 14 is directly connected to the phone system of the native country of the modem 12, that native country being determined by the country with which the internal DAA 112 is compatible. As noted above, the internal DAA 112 is typically a separate physical board, the daughter board D, inside the laptop computer 10 that is directly connected to the motherboard M of the modem 12. If one desired to move to a different country having a different telephone system, one would simply have a technician replace the internal DAA 112 with that of the country in which the user would connect to the phone system. Both the RJ11 type jack 14 and the RJ45 type jack 16 are typically located on the motherboard M of the modem 12. This alleviates the need for the internal DAA 112 to require a separate RJ11 type jack. For countries which cannot directly use the RJ11 type jack 14, an adaptor cable housing an RJ11 plug and an appropriate country plug is utilized.

The microcontroller 102 determines what is externally connected to the jacks and selects whether to use the cellular/external DAA interface 114 or the internal DAA 112. The microcontroller 102 further selects whether to use the cellular/external DAA interface 114 in a cellular phone mode or an external DAA mode. This is all done via the RI* signal, the DTA signal, and the CLK* signal, and the circuitry to accomplish this will be shown and described later.

The microcontroller 102 uses the parallel bus between it and the UART/support chip 100 to configure and determine the status of the UART/support chip 100. The UART/support chip 100 includes a number of registers addressable by the microcontroller 102. The registers provide for control of and access to a number of digital input/output (I/O) pins on the UART/support chip 100. One register provides the direction of each pin, either input or output. Another register provides the data value of bits which are set as outputs during a write operation and all data values when read. Additional bits can select the output pins as being tri-stated. Yet another register can select the various pins as causing an input to the microcontroller 102 upon a transition.

The laptop computer 10 sends and receives data to the modem 12 via the UART/support chip 100, which then serially communicates that data to the microcontroller 102. The microcontroller 102 then establishes a communications link through either the internal DAA 112 or the cellular/external DAA interface 114, whichever is selected. To establish the communications link, the microcontroller 102 directs the proper sequence of signals to either originate or answer a telephone call. For example, in the land line model, the microcontroller 102 typically directs the DSP support chip 106 to drive the OH* signal low, then, after configuring the data pump 104 through their parallel bus, "listens" for a dial tone on the line, and then directs the data pump 104 to dial the number. Then, the microcontroller "listens" for an answer carrier through the data pump 104, and then directs the data pump 104 to establish whatever type of data communications link is desired. For the cellular phone 22, the sequence will be cellular specific, but the principles of establishing a data communications link are the same. The specifics of the interface circuitry will be described later.

After establishing a data communications link, the microcontroller 102 serially sends to the data pump 104 the data to be transmitted to the communications device. The data pump 104 then processes this serial digital data and converts into an analog form suitable for communication at the rate and in the protocol desired. It then transmits this information via the TXA signal to the device the microcontroller 102 has selected, the cellular/external DAA interface 114 or the internal DAA 112, which then communicates via the active jack. Similarly, received data is transmitted from the active jack through the cellular/external DAA interface 114 or the internal DAA 112 to the data pump 104, which subsequently transmits that data to the microcontroller 102, which then transmits the data to the laptop computer 10 by way of the UART/support chip 100. Of course, the microcontroller 102 may perform compression/decompression functions on the data going either direction, or otherwise "massage" the data.

Device Selection Circuitry

Figure 3A:
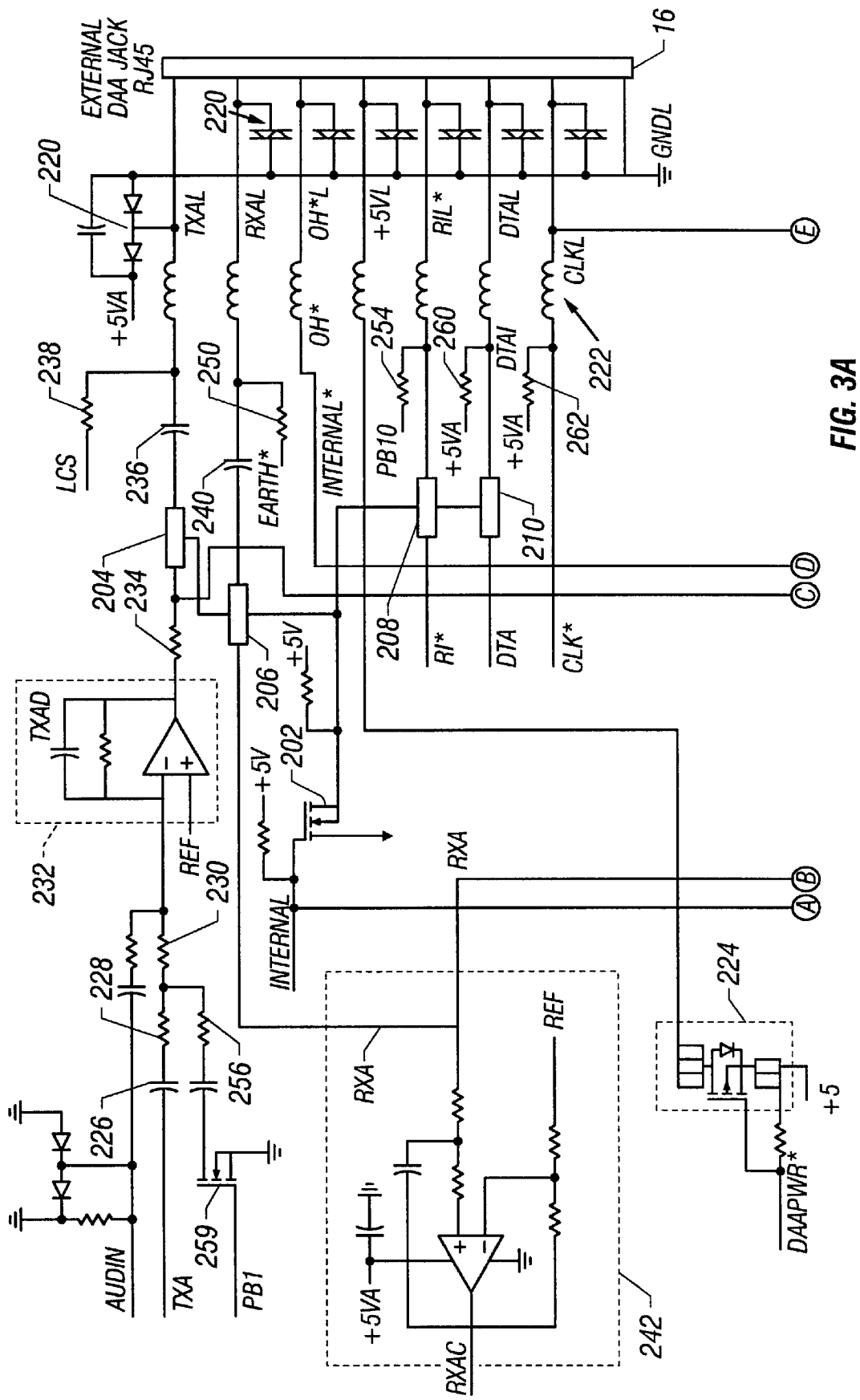
FIGS. 3A and 3B show the device selection circuitry used to select communication devices in a modem constructed according to the invention.
Figure 3B:
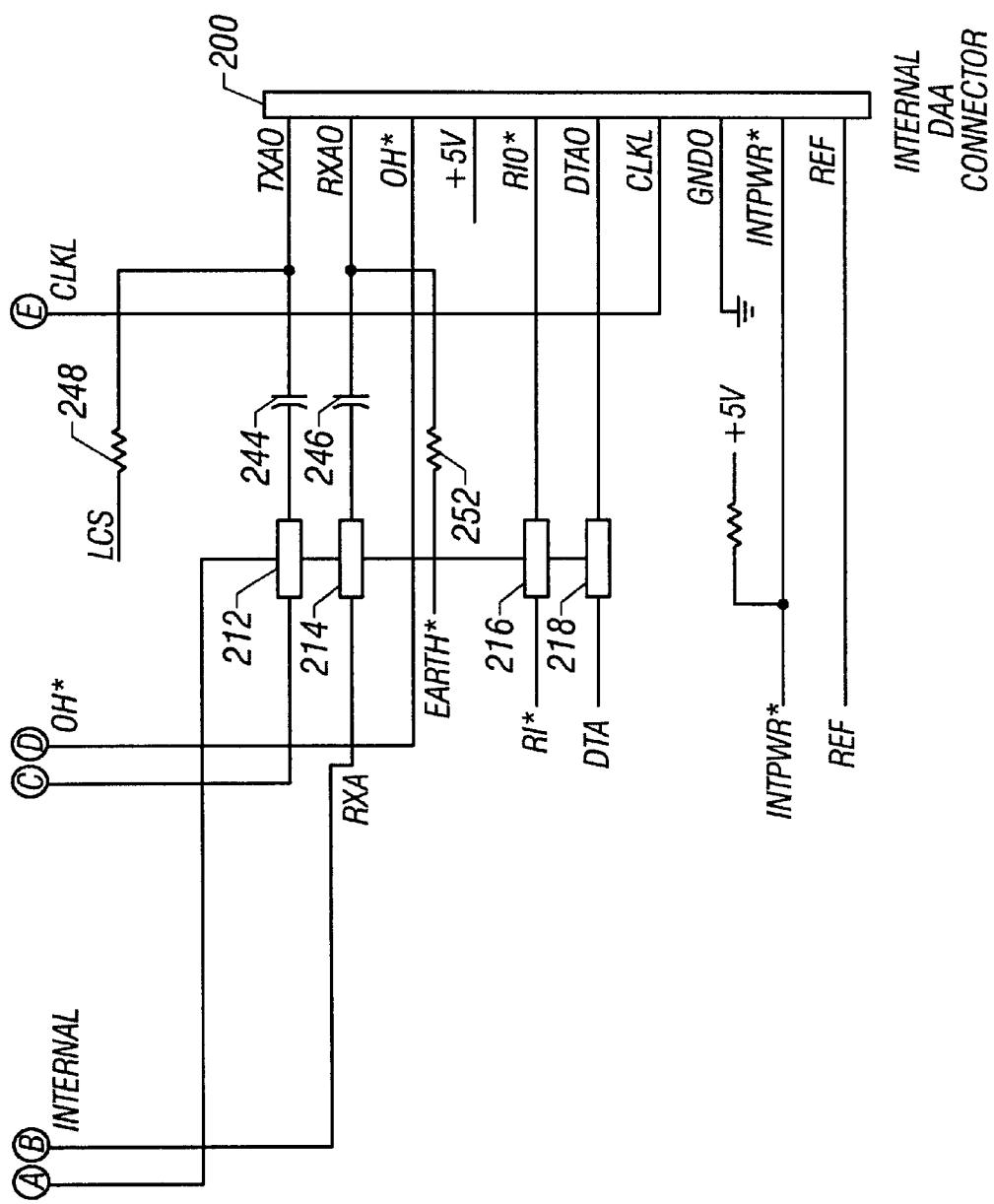

FIGS. 3A and 3B show the circuitry for selecting between utilizing the RJ45 type jack 16 and the RJ11 type jack 14. This selection circuitry selects between the RJ45 type jack 16 shown in FIGS. 3A and 3B, and an internal DAA connector 200, which then connects to the RJ11 type jack 14 via the internal DAA 112, as will be shown later in FIG. 4. This selection is accomplished by an internal selection signal INTERNAL, which is provided by the microcontroller 102. The inverse of this signal, INTERNAL*, is generated by a MOSFET 202 in an inverting configuration. In the preferred embodiment, the MOSFET 202 is a 2N7002. When INTERNAL is true, the internal DAA connector 200 is active. When INTERNAL is false, then INTERNAL* is true, and the RJ45 type jack 16 is selected for communications.

This selection process is accomplished by activation and deactivation of CMOS switches, preferably provided in CD4016 devices. Specifically, when INTERNAL is low, INTERNAL* is high, and the RJ45 type jack 16 is connected by CMOS switches to the various signal lines required for communications with the data pump 104, the UART/support chip 100, and the microcontroller 102 and the internal DAA connector 200 has connections removed from those signal lines by other CMOS switches. The TXA signal is connected to the RJ45 type jack 16 TXAL signal line via a switch 204. Similarly, the RXA signal is connected to the RJ45 type jack 16 RXAL signal line via a switch 206, the RI* signal is connected to the RJ45 type jack 16 RIL* signal line via a switch 208, and the DTA signal is connected to the RJ45 type jack 16 DTAL signal line via a switch 210. Note that a separate data signal DTAI is also provided for connection to the signal line DTAL. This is for separate control by the microcontroller 102, and is simply provided in the preferred embodiment to allow for independent control by the microcontroller 102 of the RJ45 type jack 16 DTAL line when the switch 210 is turned off.

When INTERNAL goes high, the internal DAA connector 200 becomes active. The TXA line is then connected to the internal DAA connector 200 TXA0 signal line via a switch 212, the RXA line is connected to the RXA0 signal line via a switch 214, the RI* signal is connected to the RIO* signal line via a switch 216, and the DTA signal is connected to the DTA0 signal line via a switch 218.

The CLK* signal remains connected to both the RJ45 type jack 16 and the internal DAA connector 200 at all times. The CLK* signal can be used bidirectionally by both the microcontroller 102 and the UART/support chip 100. It is typically, however, used as an input when using a Motorola or Nokia cellular phone 22, or when using the internal DAA 112 and it is on hook. CLK* is typically used as an output when using either DAA and they are off hook, or when using the external DAA 24 and it is on hook. The OH* signal is provided to the RJ45 type jack 16 as the OH*L signal line.

Also connected to the RJ45 type jack 16 are the ground signal GNDL and the 5 volt power supply +5 VL. All of the signals on the RJ45 type jack 16 are protected and isolated by clamping diodes or transorbs 220 and inductors 222. The 5 volt power supply +5 VL is selectively provided to the RJ45 type jack 16 when the signal DAAPWR* goes true, or low. When DAAPWR* goes low, it turns on RJ45 type jack power supply enable circuitry 224, which then drives +5V to the RJ45 type jack 16 +5 VL line via the inductor 222.

Before connecting to the RJ45 type jack 16 or the internal DAA connector 200, the TXA signal is filtered and driven. Specifically, the TXA signal is coupled through a capacitor 226, a resistor 228, and another resistor 230. A gain reduction block can be added if desired. It is then driven into a low pass filter 232, whose cutoff frequency is well above the highest frequency needed for modem communications. Here, that cutoff frequency is approximately 42 kHz. The signal is then transmitted through a resistor 234, the switch 204, and a coupling capacitor 236. After the coupling capacitor 236, the line can also be sensed or selectively pulled up or down via the signal LCS, connected via a resistor 238. The signal LCS, as well as signals EARTH* and DAAPWR are connected to the digital I/O pins of the UART/support chip 100 to allow the microcontroller 102 to control or monitor these signals. The PB1, PB10, and INTPWR* signals are supplied by the microcontroller 102. These signals are provided for compatibility with international and national standards, for implementation of protocols used by the modem 12, and for control of the cellular phone 22. Further, PB10 provides the microcontroller 102 with direct control of the RI* signal.

Similarly, the RXAL signal, before being transmitted to the data pump 104, is received from the RJ45 type jack 16, and driven through the inductor 222 and a coupling capacitor 240. It is then selectively driven through the switch 206, and is then provided to other circuitry in the modem 12 as the RXA signal. As the data pump 104 requires coupling of the RXA signal, the CODEC 110 of the data pump 104 is provided with an RXAC signal, which is generated by coupling the RXA signal in a coupler 242.

When the internal DAA connector 200 is selected by the switches 212 and 214, the TXA0 signal is first filtered through a capacitor 244 before being driven externally. This capacitor 244 is connected to the switch 212. The RXA0 signal is also first filtered through a capacitor 246 before being driven through the switch 214. The previously mentioned signal LCS, in addition to providing a sense and a selectable pull up/pull down to the TXAL signal, also senses or selectively pulls up or down the TXA0 signal between the internal connector 200 and the capacitor 244 via a resistor 248. The EARTH* signal also provides a sense or selectable pull up/pull down of the RXAL signal between the RJ45 type jack 16 and the capacitor 240 via a resistor 250 and provides a sense or selectable pull up/pull down of the RXA0 signal between the internal DAA connector 200 and the capacitor 246 via a resistor 252. The PB10 signal provides a sense or selectable pull up or down of the RIL* line via a resistor 254, and the PB1 signal is used to selectively attenuate the TXA signal via a resistor 256, a capacitor 258, and a switch 259, after that signal has been filtered through the capacitors 226 and 228. The DTAL and CLKL signals are pulled up to 5 volts through, respectively, resistors 260 and 262. On the internal DAA connector 200, two additional signals are provided. These are the internal power select signal INTPWR*, which is also pulled up by a resistor 264, and the REF signal, which is a 2.5 volt precision reference.

Internal DAA Country Identification and Power Down Circuitry

Figure 4:
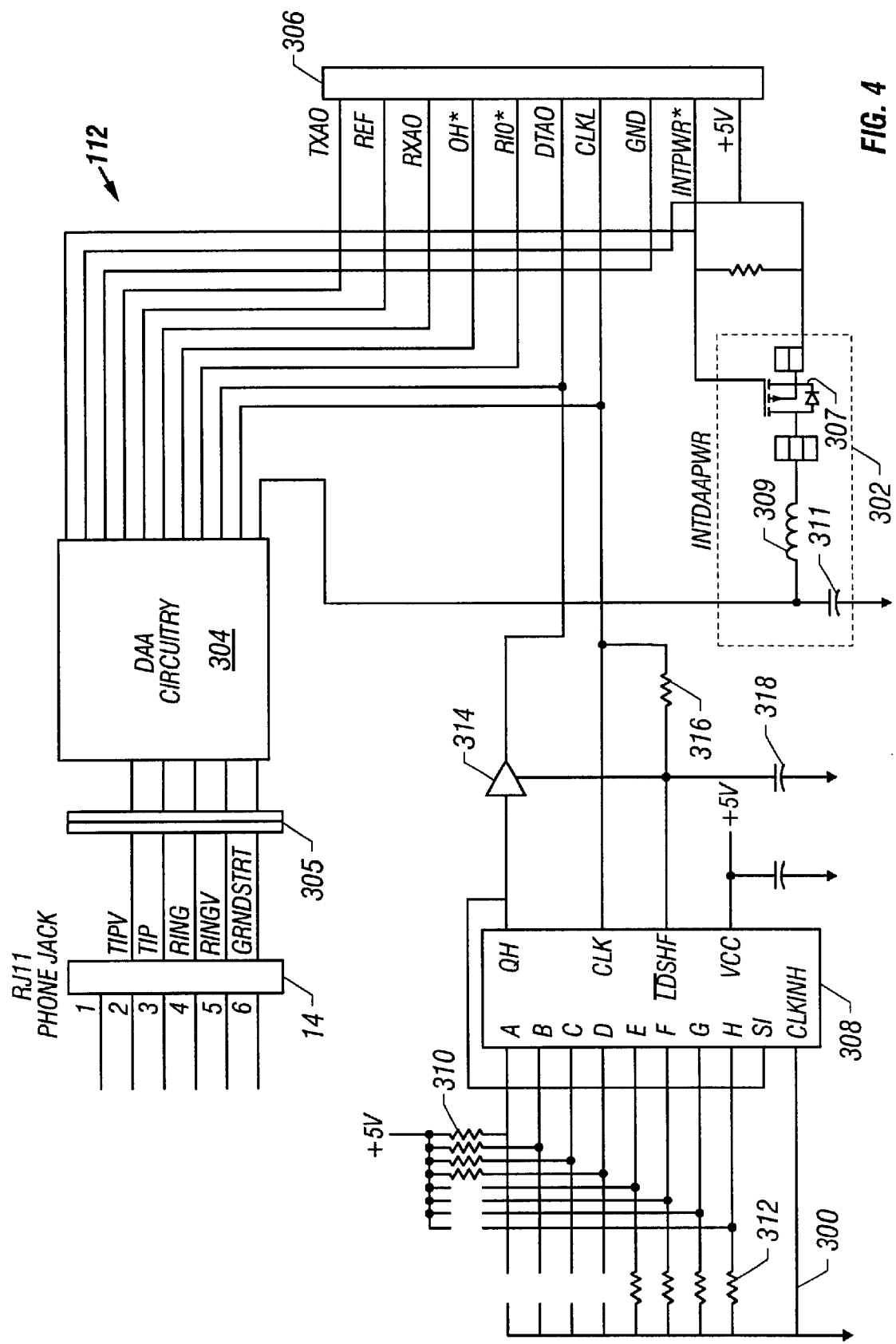
FIG. 4 shows the country identification and power down circuitry used in an internal DAA connected to the modem according to the invention.

FIG. 4 shows circuitry associated with the internal DAA 112. Three main blocks of circuitry are shown: the country identification circuitry 300, the power down circuitry 302, and the DAA circuitry 304. This circuitry is typically all placed on one board that is then connected to the main board of the modem 12 by connectors 305 and 306, which connect to the internal DAA connector 200. This allows for convenient swapping of internal DAA's when one desires to move to or remain in a different country. As previously discussed, the RJ11 type jack 14 is typically located on the main board of the modem 12, and the connector 305 allows lines from the DAA circuitry 304 to connect to the RJ11 type jack 14. Typically, the connectors 305 and 306 are separate physical connectors.

The DAA circuitry 304 is typical DAA circuitry used to connect a modem to a land line, or physical telephone line, and uses the standard signals TIP, RING, TIPV, RINGV, and GRNDSTRT. The internal DAA 112 is connected to the internal DAA connector 200 via the connector 306. All of the signals from the connector 306 connect to the DAA circuitry 304. The signals INTPWR* and the +5V power line connect to the power down circuitry 302. When INTPWR* goes low, the power down circuitry 302 is enabled, and power is supplied to the DAA circuitry 304 through the signal INTDAAPWR. Specifically, a power switch 307 is connected to the +5V signal and to the signal INTPWR*. INTPWR* going low turns the power switch 307 on, providing power to an inductor 309 that then provides power to the DAA circuitry 304. Filtering the supplied power, and connected between the inductor 309 and ground, is a filtering capacitor 311. The power down circuitry 302 is standard switching circuitry, and is well known to those in electronic design.

The country identification circuitry 300 includes a shift register 308, which in the preferred embodiment is a 74HC165. The shift register 308 has certain of its parallel inputs pulled up by pullup resistors 310 and certain of its parallel inputs pulled down by pulldown resistors 312 to indicate a particular country. The output QH of the shift register 308 is driven to its serial input S1 as well as to an output buffer 314. The output buffer 314 is typically a 74HC126, and its output selectively drives the data line, DTA0. The LD*/SHF signal input of the shift register 308 is driven by an RC circuit consisting of a resistor 316 and a capacitor 318. The resistor 316 is connected to the CLKL signal and to the capacitor 318, which is then connected to ground. The LD*/SHF signal input of the shift register 308 is connected between the resistor 316 and the capacitor 318. This signal is also connected to the enable line of the output buffer 314.

When the LD*/SHF signal is high, the output buffer 314 is enabled, and the shift register 308 serially outputs the contents of its parallel inputs on its QH output as clocked by its CLK signal input, which is connected to CLKL.

The time constant of the RC filter made up of the resistor 316 and the capacitor 318 is approximately 0.5 milliseconds. When the clock is running at its slow rate, which has a period of much greater than 0.5 milliseconds, the LD*/SHF signal remains low, as does the enable line to the output buffer 314. This instructs the shift register 308 to load its parallel inputs A through H as specified by the pull up resistors 310 and the pull down resistors 312, and tristates the output buffer 314. When the CLKL signal is sped up, the LD*/SHF signal goes high, enabling the buffer 314 and causing the shift register 300 to shift data on the rising edges of the CLKL signal.

Figure 5:
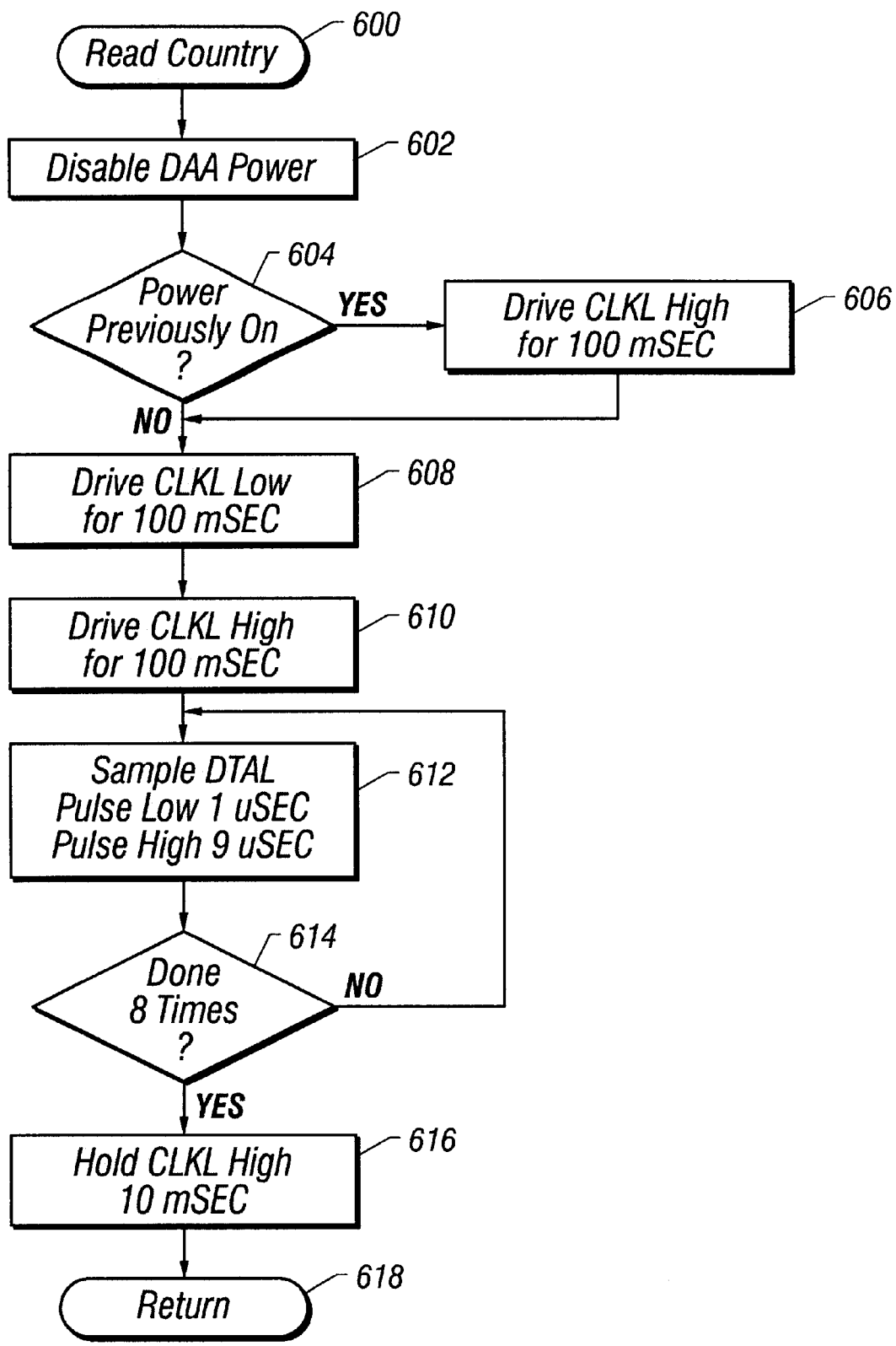
FIG. 5 shows a flowchart of a routine for reading the country identification code from a DAA.

FIG. 5 shows a flow chart of the procedure READ COUNTRY 600 used to read the DAA's country code. To read the contents of the shift register serially, the microcontroller 102 first disables power to the selected DAA at step 602, here the internal DAA 112. Any external DAA 24 is configured with similar circuitry as described here. The microcontroller 102 disables power by driving the signal INTPWR* high. If the power to the DAA was previously on, as tested as step 604, the microprocessor then sets the signal CLKL high for 100 milliseconds at step 606. The microcontroller 102 then drives the CLKL line low for 100 milliseconds at step 608, and then high for 100 milliseconds at step 610. This enables and loads the country code into the shift register 308. The most significant bit is available on the DTA0 line at this point, because the enable to the output buffer 314 is high. The microcontroller 102 then, at step 612, samples the DTA0 line, which at the microcontroller 102 is the DTA line, and follows this sampling with pulses logic low for one microsecond, then logic high for nine microseconds. The microcontroller 102 does this 8 times, as indicated by step 614. At the end of each of these sixteen pulses, the microcontroller 102 samples the DTA0 line, which contains the next bit of data. After all sixteen pulses have been emitted, the CLKL line is held at a logic high for a minimum of 10 microseconds at step 616, and the read is then complete at step 618.

Returning to FIG. 4, the pull up resistors 310 and the pull down resistors 312 are connected in an arbitrary way to indicate which country's telephone lines the DAA circuitry 304 is constructed to communicate with. In FIG. 4, the A, B, C, and D lines of the shift register 308 are pulled up, and the E, F, G, and H lines are pulled down. When clocked out, they serially clock out as "00001111." For another country, another arbitrary value is used. Further, all eight bits need not be used to designate country codes. For example, they can designate a type of DAA, or a particular configuration.

In this way, the microcontroller 102 can determine the configuration of the internal DAA 112 by "twiddling" the CLK signal and then reading the DTA0 signal returned, which is returned to the microcontroller 102 as the DTA signal. This circuitry is repeated on any attached external DAA 24 in a similar manner. In addition, all eight bits need not be used for country encoding but can also be used for other decoding purposes.

The microcontroller 102, through its signal lines INTERNAL and signal lines INTPWR* and DAAPWR* can both select and power up and down both the internal DAA 112 and any external DAA 24. The INTERNAL line allows for selection between the RJ45 type jack 16 and the internal connector 200, while the INTPWR* and DAAPWR* signals respectively provide for powering up or down the internal DAA 112 or any external DAA 24. The powering up and down of the internal versus the external DAA's is important on a laptop or notebook computer, as keeping these DAA's powered up requires a good deal of energy. Thus, by powering down these DAA's when they are not required, the laptop computer 10 that uses the modem 12 can experience significantly increased battery life because of these power saving features of the modem 12.

Connections to Cellular Phones

Figure 6A:
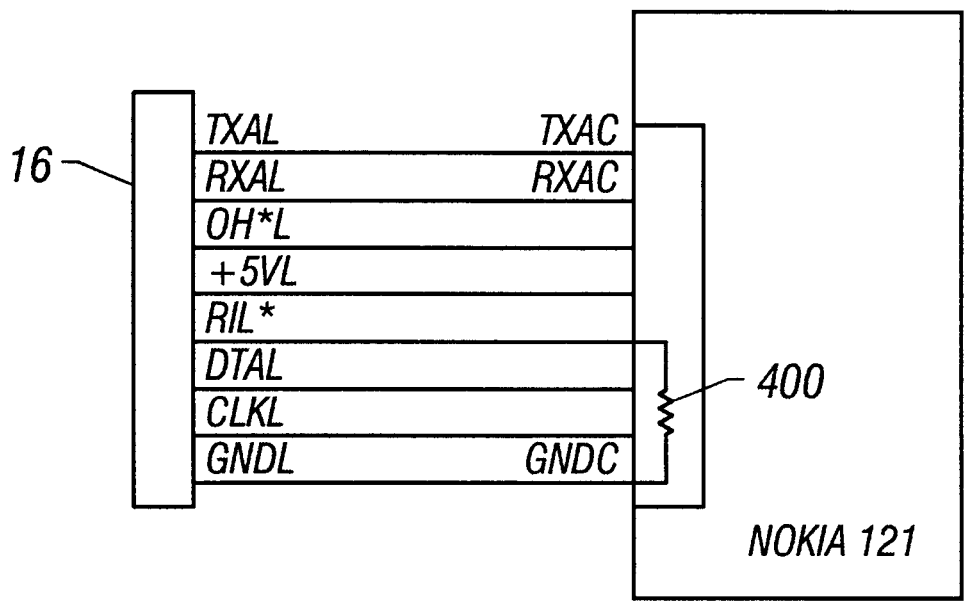
FIGS. 6A–B show the connections between the modem according to the invention and various makes of cellular phones.
Figure 6B:
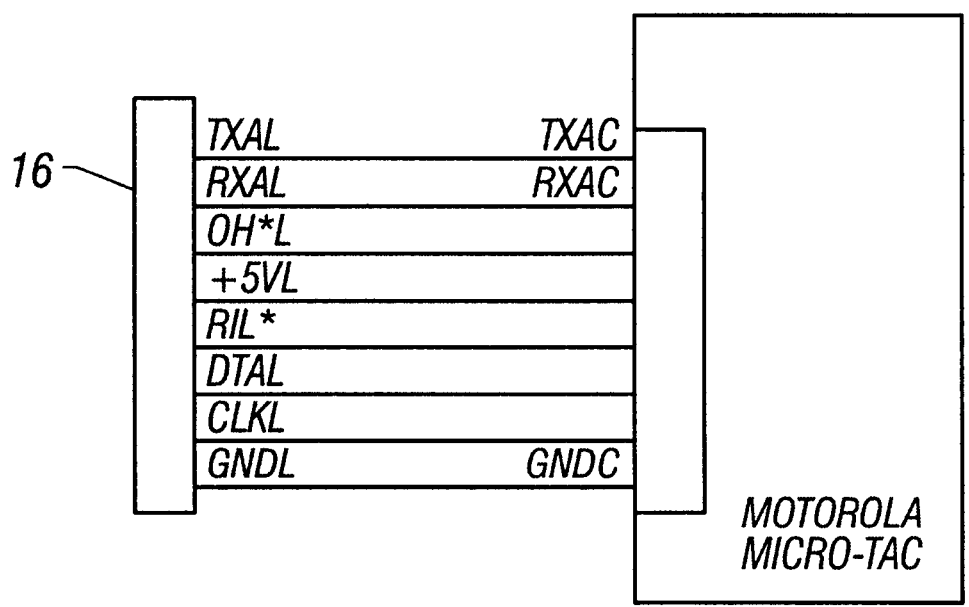

FIGS. 6A–B show connections as they would be made to the internal buses of various manufacturers' cellular phones such as the Motorola Micro-Tac and the Nokia 121. Three signal lines are provided in the modem 12 for interfacing to various manufacturer's cellular phones. These signal lines are the DTA, CLK*, and RI*, and go to both the UART/support chip 100 and the microcontroller 102. The connections on both the UART/support chip 100 and on the microcontroller 102 are made by configurable logic pins such that each of these signals can operate either as an input, as an output, or bi-directionally, as noted above. Exactly how these pins are configured is dependent upon the protocol of a particular manufacturer's cellular phone's internal bus.

Cellular telephones by various manufacturers utilize their own non-standard data buses. The modem 112 communicates with these data buses by firmware specific commands, which are known for each particular cellular phone and available from the particular manufacturer. As each particular cellular phone has its own protocol, the firmware that controls the microcontroller 102 is programmed to selectively enable or disable the RIL*, DTAL and CLKL signals. These signals can be enabled and disabled by tri-stating the appropriate pins on the microcontroller 102 and the UART/support chip 100. The firmware necessary for operation of each of the supported cellular phones, as well as the land line firmware and remaining portions of the operating software, is contained in the ROM 101. Selection of a particular cellular phone and its related firmware is based on a data value in the RAM and NVRAM 103, this data value being provided by a configuration command from the host computer 10 to the modem 12. The microcontroller 102 notes this command and stores the proper code for later use. If a different cellular phone is being used, reconfiguration is required.

For example, FIG. 6A shows how the Nokia 121 cellular phone is connected to the RJ45 type jack 16. In the Nokia 121, the CLKL and DTAL lines, and the corresponding CLK* and DTA lines, are used as a 9600 bit per second serial digital data line for transmitting data to the internal bus of the Nokia 121. The DTAL (and DTA) line is used for reading data from the internal bus of the Nokia 121 while the CLKL (and CLK*) line is used for providing data to the internal bus of the Nokia 121. Finally, the RIL* line is pulled down to terminate the RIL* signal to prevent a false indication of ring. For the Nokia 121, the DTA and CLK* pins of the UART/support chip 100 are tristated, while the RI* pin is configured as an input. In the microcontroller 102, the DTA pin is configured as an input, the CLK* pin is configured as an output, and the PB10 pin, which can drive RI*, is configured as an input. In this configuration, the microcontroller 102 can determine whether the Nokia 121 phone is present by querying the UART/support chip 100 to determine whether the RI* signal has been pulled high, or can instead examine its own PB10 pin.

The Motorola Micro-Tac, as shown in FIG. 6B, requires three communications lines. In the Micro-Tac, the CLKL (and CLK*) and the DTAL (and DTA) lines transmit data, and the RIL* (and RI*) line receives data. In this configuration, the RI* signal both drives and reads an open collector output read line. The UART/support chip 100 is programmed to provide interrupts upon change in the DTA and CLK* signals. In this configuration, the Motorola uses a slower communications bus, so all communications are carried out through the UART/support chip 100, rather than directly with the microcontroller 102. This is done by configuring on the UART/support chip 100 the DTA, CLK*, and RI* pins as inputs, and configuring the DTA and CLK* pins on the microcontroller 102 as inputs, and configuring the PB10 pin as an output, for driving RI*.

Of course, each manufacturer uses its own proprietary bus, and different lines would have to be configured, and different firmware for the microcontroller 102 written, for each of the various manufacturer's lines. By properly controlling the lines according to the specific protocol, proper digital communications can be maintained with the cellular phone.

Default Selection Algorithm

In operation, the microcontroller 102 uses a default selection algorithm to select whether to set up communications through the cellular phone 22, the internal DAA 112, or the external DAA 24. In configuring the modem through the laptop computer 10, the user has previously specified what type of cellular phone would be connected if one were to be connected at all. This user specification has been made by communicating with the UART/support 100, which in turn communicates with the microcontroller 102. This communication is done during a setup procedure and stored in non-volatile memory.

Figure 7:
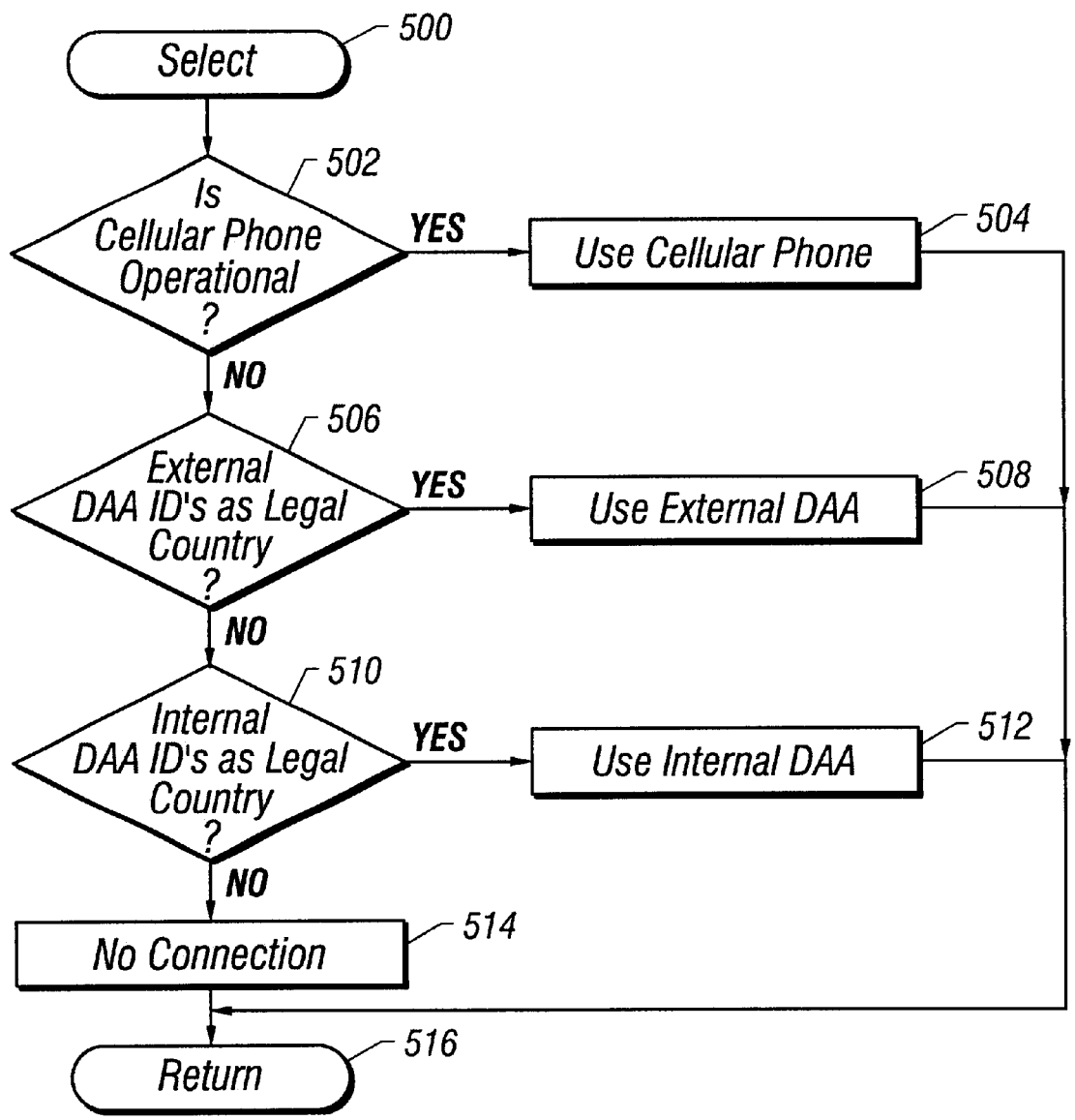
FIG. 7 shows a flowchart of a routine used by the processor controlling the modem constructed according to the invention for selecting whether to use a connected cellular phone, an external DAA, or the internal DAA.

FIG. 7 shows the sequence used by the microcontroller 102 to select what type of communications link to establish. Before attempting to establish any serial modem communications link and each time a link is to be established, the microcontroller 102 performs the select algorithm 500. At step 502, the microcontroller 102 first sets the INTERNAL line to false. This selects the RJ45 type jack 16, and accordingly selects the cellular/external DAA interface 114 for connection to the internal circuitry of the modem 12. The microcontroller 102 first determines whether an operational cellular phone is connected to the RJ45 type jack 16. How this is determined is cellular phone specific. As the user has previously specified the type of cellular telephone that would be connected, the microcontroller 102 performs a corresponding test to determine whether that cellular phone is present. For some phones, the microcontroller 102 merely needs to examine a line. For example, the Nokia 121 interface pulls the RI* line high. On other types of phones, the microcontroller 102 must send an "are you there" message and look for a response. On some phones, the phone specifically responds to such a message, while other phones simply route the message back to the microprocessor 102. In any case, the method is cellular phone specific and is programmed into the firmware of the microcontroller 102. If the cellular phone 22 is present, the microcontroller 102 at step 504 sets a flag specifying to use the cellular phone to establish a communications link.

If an operational cellular phone 22 is not connected to the RJ45 type jack 16, the microcontroller 102 then, at step 506, determines whether the external DAA 24 is present. It does this by toggling the CLK* line, as discussed previously in relation to FIGS. 4 and 5. As the RJ45 type jack 16 is still enabled, any external DAA 24 connected to that jack will respond with a country code. If a legal country code is returned via the DTA line, the microcontroller 102 in step 508 sets a flag to use the external DAA 24 for any subsequent communications.

Otherwise, the microcontroller 102 at step 510 determines whether the internal DAA 112 is connected. First, the microcontroller 102 sets the INTERNAL signal high, thus selecting the internal DAA connector 200. It then toggles the CLK* signal, again as specified in the discussions of FIGS. 4 and 5, and attempts to read the country code over the DTA signal as discussed in relation to FIGS. 4 and 5. If a legal country code is returned, then the microcontroller 102 at step 512 sets a flag to use the internal DAA 112 for subsequent communications. If no connection can be established, an appropriate ERROR flag is set at step 514. At step 516, the microcontroller 102 returns to other sequences to attempt to establish a communications link over the flagged channel.

This sequence is advantageous in practice because whenever one attaches an external device to the RJ45 type jack 16, such as an external DAA 24 or a cellular phone 22, the modem 12 first attempts to use that device to establish a communications link. Only on failing to do so does it attempt to establish a link through the normal telephone jack, the RJ11 type jack 14.

If both the RJ11 type jack 14 is connected to a normal telephone line, and a cellular phone 22 is connected to the RJ45 type jack 16, the cellular phone 22 is chosen. Similarly, if both an external DAA 24 and an internal DAA 112 are present, the external DAA 24 is chosen. These selections can be overridden by specific commands from the user via the laptop computer 10 to the microcontroller 102 in a setup or configuration program.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for establishing a communications link using a modem that includes a connector and an internal data access arrangement, comprising the steps of:
   determining whether an operational cellular phone is connected to the connector;
   if the operational cellular phone is connected, selecting the operational cellular phone for establishing a communications link;
   if an operational cellular phone is not connected, determining whether an external data access arrangement is connected to the connector;
   if the external data access arrangement is connected and an operational cellular phone is not connected, selecting the external data access arrangement for establishing a communications link; and
   if an external data access arrangement is not connected and an operational cellular phone is not connected, selecting the internal data access arrangement for establishing a communications link.

2. The method of claim 1, wherein the step of determining whether an external data access arrangement is connected and the step of selecting the internal data access arrangement each further comprise the steps of:
   sending a signal instructing any connected data access arrangement to respond with a code;
   attempting to receive said code; and
   determining if any received code is a valid code indicating a proper data access arrangement.

3. The method of claim 1, wherein the step of determining whether an external data access arrangement is connected and the step of selecting the internal data access arrangement each further comprise the steps of:
   sending a signal instructing any connected data access arrangement to respond with a code;
   attempting to receive said code; and
   determining if any received code is a valid code indicating a proper data access arrangement.

4. A system for transferring data using a selected one of a plurality of telephone network access devices including at least one radiotelephone network access device when supplied with one of a plurality of different software drivers having the operating commands necessary for controlling the selected telephone network access devices, comprising:
   computer means for processing data transferable over the telephone network access device, and having a data communications program; and
   modem means operably connected to the computer means for transferring data between said computer means and a remote data transfer device over said radiotelephone network access devices, said modem means comprising a single integrated portable unit including:
   data lines internal to the modem means for carrying the data passing between the modem means and the radiotelephone network access device;
   control signal lines internal to the modem means for carrying control signals for controlling and/or monitoring the operation of said radiotelephone network access device;
   jack means connected to said control signal lines and said data lines for providing an external connection of said data lines and signal lines to said radiotelephone network access device; and
   modem controller means connected to said computer means and said control signal lines for controlling the operation of said modem means, said modem controller means operating to access one of the plurality of software drivers for operating said modem means in conjunction with the selected one of said plurality of telephone network access devices to cause the operation of said control signal lines to be varied in response to said software driver to permit the control of call placement functions of the selected telephone network access device by said modem means, wherein the jack means comprises a single standardized telephone connector and said modem controller means further comprises:

means for determining whether an operational cellular phone is connected to the single standardized telephone connected to the single standardized telephone connector;

means for selecting the operational cellular phone for establishing a communications link if the operational cellular phone is connected;

means for determining whether an external data access arrangement is connected to the single standardized telephone connector if an operational cellular phone is not connected; and means for selecting the external data access arrangement for establishing a communications link if the external data access arrangement is connected and an operational cellular phone is not connected.

5. A system for transferring data using a selected one of a plurality of telephone network access devices including at least one radiotelephone network access device when supplied with one of a plurality of different software drivers having the operating commands necessary for controlling the selected telephone network access devices, comprising:

computer means for processing data transferable over the telephone network access device, and having a data communications program; and modem means operably connected to the computer means for transferring data between said computer means and a remote data transfer device over said radiotelephone network access devices, said modem means comprising a single integrated portable unit including:

data lines internal to the modem means for carrying the data passing between the modem means and the radiotelephone network access device;

control signal lines internal to the modem means for carrying control signals for controlling and/or monitoring the operation of said radiotelephone network access device;

jack means connected to said control signal lines and said data lines for providing an external connection of said data lines and signal lines to said radiotelephone network access device; and modem controller means connected to said computer means and said control signal lines for controlling the operation of said modem means, said modem controller means operating to access one of the plurality of software drivers for operating said modem means in conjunction with the selected one of said plurality of telephone network access devices to cause the operation of said control signal lines to be varied in response to said software driver to permit the control of call placement functions of the selected telephone network access device by said modem means, wherein the single standardized telephone connector is an RJ-45 connector and said modem controller means further comprises:

means for determining whether an operational cellular phone is connected to the RJ-45 connector;

means for selecting the operational cellular phone for establishing a communications link if the operational cellular phone is connected;

means for determining whether an external data access arrangement for establishing a communications link if the external data access arrangement is connected and an operational cellular phone is not connected.

6. A system for transferring data using a selected one of a plurality of telephone network access devices including at least one radiotelephone network access device when supplied with one of a plurality of different software drivers having the operating commands necessary for controlling the selected telephone network access devices, comprising:

computer means for processing data transferable over the telephone network access device, and having a data communications program; and modem means operably connected to the computer means for transferring data between said computer means and a remote data transfer device over said telephone network access devices, said modem means comprising:

data pump means for transferring data between the modem means and the telephone network access device;

a tip-and-ring interface operatively connected to said data pump means for carrying signals between the modem means and said telephone network access device at least when said telephone network access device operates using a tip-and-ring interface;

receive and transmit data lines operatively connected to said data pump means to provide a receive line and transmit line interface for carrying data between the modem means and said telephone network access device at least when said telephone network access device operates using a receive line and transmit line interface;

control signal lines for carrying control signals for controlling and/or monitoring the operation of said radiotelephone network access device;

modem controller means connected to said computer means, said control signal lines, said tip-and-ring interface, and said data pump means for controlling the operation of said modem means by accessing one of the plurality of software drivers for operating said modem means in conjunction with the selected one of said plurality of telephone network access devices to cause the operation of said control signal lines to be varied in response to said software driver to permit the control of call placement functions of the selected telephone network access device by said modem means; and jack means connected to said control signal lines, said data lines, and said tip-and-ring interface for providing an external connection of said tip-and-ring interface, said receiving line and transmit line interface, and said control signal lines as required to operably connect the modem means to said selected telephone network access device, wherein said modem controller means further comprises:

means for determining whether an operational cellular phone is connected to the jack means;

means for selecting the operational cellular phone for establishing a communications link if the operational cellular phone is connected;

means for determining whether an external data access arrangement is connected to the jack means if an operational cellular phone is not connected; and means for selecting the external data access arrangement for establishing a communications link if the external data access arrangement is connected and an operational cellular phone is not connected.

7. A system for transferring data using a selected one of a plurality of telephone network access devices including at least one radiotelephone network access device when supplied with one of a plurality of different software drivers having the operating commands necessary for controlling the selected telephone network access devices, comprising:

computer means for processing data transferable over the telephone network access device, and having a data communications program; and modem means operably connected to the computer means for transferring data between said computer means and a remote data transfer device over said telephone network access devices, said modem means comprising:

data pump means for transferring data between the modem means and the telephone network access device;

a tip-and-ring interface operatively connected to said data pump means for carrying signals between the modem means and said telephone network access device at least when said telephone network access device operates using a tip-and-ring interface;

receive and transmit data lines operatively connected to said data pump means to provide a receive line and transmit line interface for carrying data between the modem means and said telephone network access device at least when said telephone network access device operates using a receive line and transmit line interface;

control signal lines for carrying control signals for controlling and/or monitoring the operation of said radiotelephone network access device;

modem controller means connected to said computer means, said control signal lines, said tip-and-ring interface, and said data pump means for controlling the operation of said modem means by accessing one of the plurality of software drivers for operating said modem means in conjunction with the selected one of said plurality of telephone network access devices to cause the operation of said control signal lines to be varied in response to said software driver to permit the control of call placement functions of the selected telephone network access device by said modem means; and jack means connected to said control signal lines, said data lines, and said tip-and-ring interface for providing an external connection of said tip-and-ring interface, said receiving line and transmit line interface, and said control signal lines as required to operably connect the modem means to said selected telephone network access device, the system including at least one cable means for operably connecting said jack means to a connection port of said telephone network access device, wherein said jack means comprises a standard telephone connector, and said cable means extends at least between a first connector mating with said standard telephone connector and a second connector mating with said connection port of said telephone network access device, wherein said modem controller means further comprises:

means for determining whether an operational cellular phone is connected to the standard telephone connection;

means for selecting the operational cellular phone for establishing a communications link if the operational cellular phone is connected;

means for determining whether an external data access arrangement is connected to the standard telephone connector if an operational cellular phone is not connected; and means for selecting the external data access arrangement for establishing a communications link if the external data access arrangement is connected and an operational cellular phone is not connected.

8. A system for transferring data using a selected one of a plurality of telephone network access devices including at least one radiotelephone network access device when supplied with one of a plurality of different software drivers having the operating commands necessary for controlling the selected telephone network access devices, comprising:

computer means for processing data transferable over the telephone network access device, and having a data communications program; and modem means operably connected to the computer means for transferring data between said computer means and a remote data transfer device over said telephone network access devices, said modem means comprising:

data pump means for transferring data between the modem means and the telephone network access device;

a tip-and-ring interface operatively connected to said data pump means for carrying signals between the modem means and said telephone network access device at least when said telephone network access device operates using a tip-and-ring interface;

receive and transmit data lines operatively connected to said data pump means to provide a receive line and transmit line interface for carrying data between the modem means and said telephone network access device at least when said telephone network access device operates using a receive line and transmit line interface;

control signal lines for carrying control signals for controlling and/or monitoring the operation of said radiotelephone network access device;

modem controller means connected to said computer means, said control signal lines, said tip-and-ring interface, and said data pump means for controlling the operation of said modem means by accessing one of the plurality of software drivers for operating said modem means in conjunction with the selected one of said plurality of telephone network access devices to cause the operation of said control signal lines to be varied in response to said software driver to permit the control of call placement functions of the selected telephone network access device by said modem means; and jack means connected to said control signal lines, said data lines, and said tip-and-ring interface for providing an external connection of said tip-and-ring interface, said receiving line and transmit line interface, and said control signal lines as required to operably connect the modem means to said selected telephone network access device, the system including at least one cable means for operably connecting said jack means to a connection port of said telephone network access device, wherein said jack means comprises a standard telephone connector, and said cable means extends at least between a first connector mating with said standard telephone connector and a second connector mating with said connection port of said telephone network access device, wherein said first connector is an RJ-45 connector, wherein said modem controller means further comprises:

means for determining whether an operational cellular phone is connected to the RJ-45 connector;

means for selecting the operational cellular phone for establishing a communications link if the operational cellular phone is connected;

means for determining whether an external data access arrangement is connected to the RJ-45 connector if an operational cellular phone is not connected; and means for selecting the external data access arrangement for establishing a communications link if the external data access arrangement is connected and an operational cellular phone is not connected.

9. A single integrated portable modem unit for installation on a portable computer means for sending and receiving data over a standard cellular radiotelephone network, having basic circuits compatible with a plurality of portable radiotelephone network access devices responding to predetermined call placement function commands and adapted for a particular type of radiotelephone network access device by provision of a device-specific program control component and a cable connection, comprising:

(a) a single integrated portable hardware portion adapted for installation on a variety of said portable computer means for use with at least one said radiotelephone network access device, including at least:

(i) a standardized connector mating with a corresponding connector in the computer means to operably connect the modem for data transfer with the computer means;

(ii) data pump means for modulating data signals received from the computer means to adapt the data signals for transmission to the remote data transfer device over the cellular radiotelephone network and for demodulating data signals received from the remote data transfer device over the cellular radiotelephone network for transfer to the computer means;

(iii) a receive and transmit interface including a receive line and a transmit line connected with said data pump means and adapted to be connected with the radiotelephone network access device for carrying data between the data pump means and the radiotelephone network access device;

(iv) memory means for storing a software driver for generating operating commands for controlling unique call placement functions of the radiotelephone network access device;

(v) a plurality of control signal lines adapted to carry control signals for controlling and/or monitoring call placement functions of the radiotelephone network access device;

(vi) modem controller means connected to said control signal lines, said receive and transmit interface, said data pump means, and said memory means for controlling the operation of the modem to allow data to be exchanged between the computer means and the remote data transfer device through the receive and transmit interface when the modem connected to the radiotelephone network access device and for controlling the call placement functions of the radiotelephone network access device through said control lines and said receive and transmit interface as determined by the software drive stored in said memory means;

(b) a jack means connected to said control signal lines and said data lines for providing an external connection to the radiotelephone network access device of said radiotelephone network access device of said receive line and transmit line interface and a number of said control signal lines as required to operably connect the modem to the radiotelephone network access device;

(c) a multi-line cable means having a connector compatible with said jack means at one end thereof and a connector compatible with the radiotelephone network access device at another end thereof for operably connecting said jack means to the specific radiotelephone network access device; and (d) at least one said software driver installed in said memory means containing information for generating call placement function commands on the control signal lines in conjunction with line connections established by the cable means so that said modem controller means uses said software driver to generate call placement function commands for transmission through said cable means to predetermined terminals on the radiotelephone network access device appropriately connected thereto to control call placement functions of the radiotelephone network access device, wherein said modem controller means further comprises:

means for determining whether an operational cellular phone is connected to the jack means;

means for selecting the operational cellular phone for establishing a communications link if the operational cellular phone is connected;

means for determining whether an external data access arrangement is connected to the jack means if an operational cellular phone is not connected; and means for selecting the external data access arrangement for establishing a communications link if the external data access arrangement is connected and an operational cellular phone is not connected.

* * * * *